E. R. HIBBARD.
SELF LOCKING NUT.
APPLICATION FILED NOV. 19, 1906.
960,090.
Patented May 31, 1910.
2 SHEETS—SHEET 1.
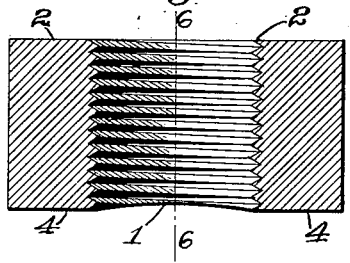
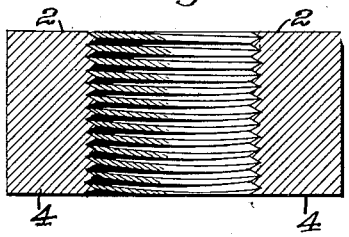
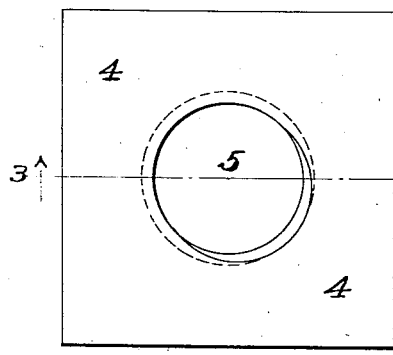
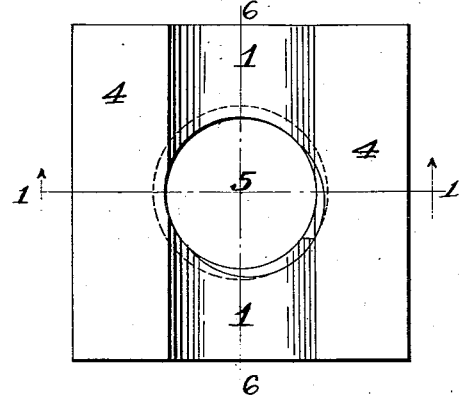
Witnesses:
Geo. H. Morse.
Charles J. Cobb.
Inventor:
Edward R. Hibbard
By Hill & Hill
Attys.

E. R. HIBBARD.
SELF LOCKING NUT.
APPLICATION FILED NOV. 19, 1906.

960,090.

Patented May 31, 1910.
2 SHEETS—SHEET 2.

Witnesses:
Geo. H. Morse.
Charles J. Cobb.

Inventor:
Edward R. Hibbard
By Hill & Hill
Att'ys.

UNITED STATES PATENT OFFICE.

EDWARD R. HIBBARD, OF OAK PARK, ILLINOIS, ASSIGNOR TO GRIP NUT COMPANY, OF CHICAGO, ILLINOIS, A CORPORATION OF ILLINOIS.

SELF-LOCKING NUT.

960,090.

Specification of Letters Patent.   Patented May 31, 1910.

Application filed November 19, 1906. Serial No. 344,164.

*To all whom it may concern:*

Be it known that I, EDWARD R. HIBBARD, a citizen of the United States, residing at Oak Park, county of Cook, and State of Illinois, have invented a certain new, useful, and Improved Self-Locking Nut, of which the following is a description.

My improvement relates to screw-threaded nuts and especially to that type of nuts which are provided with means to grip the bolt upon which the nut is mounted and prevent accidental movement between the nut and bolt.

The object of my invention is to produce a nut of the kind described, inexpensive to manufacture, convenient to use, positive in its action, and of the usual or any preferred form entirely free from slots, grooves, projections, or any other visible means for producing the gripping action upon the bolt.

To this end my invention consists in the novel construction and arrangements of parts herein shown and described and more particularly pointed out in the claims.

Figure 6:
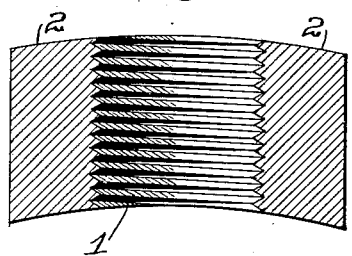
Figure 5:
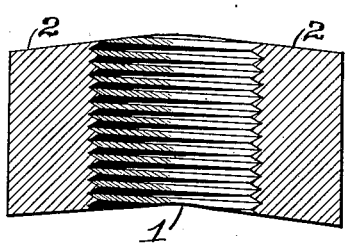
Figure 7:
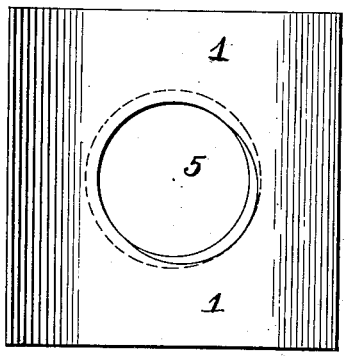
Figure 8:
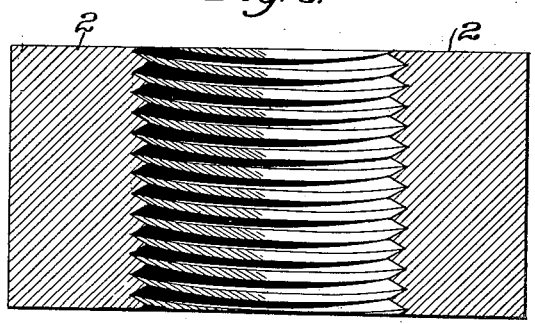

In the accompanying drawings wherein like or similar reference characters indicate like or corresponding parts; Figure 1 is a section taken substantially on line 1—1 of Fig. 2 showing my nut as threaded but before its face is straightened to produce the locking effect. Fig. 2 is a plan view of the bottom face of the nut as shown in Fig. 1. Fig. 3 is a section taken substantially on line 3—3 of Fig. 4 showing the finished nut. Fig. 4 is a plan view of the finished nut as shown in Fig. 3. Fig. 5 is a section similar to Fig. 1 showing a slightly modified form of blank for producing my nut, before its face is straightened. Fig. 6 is a similar section of another modified form of nut blank. Fig. 7 is a common form of nut curved as shown in Figs. 5 and 6. Fig. 8 is an enlarged section showing a finished nut formed from the blank shown in Figs. 5 and 6.

It should be noted that in Figs. 1, 5 and 6, the curve of the nut, and in Figs. 3 and 8, the curve of the threads from the normal is shown somewhat exaggerated, especially in Figs. 5, 6 and 8, to more clearly show the construction. In actual practice the curvature is so slight as to be scarcely noticeable and amounts to but a fractional part of the pitch.

In the preferred form of my device shown in the drawings, a screw-threaded nut blank is provided with a concave face that, is, providing one face with a depression 1 preferably extending entirely across the nut. The depression 1 may be of any width. In Fig. 1 it is shown less in width than the diameter of the threaded opening, while in Figs. 5 and 6 it occupies the entire face of the nut. In either case the depth of the depression is slight and amounts to not more, and preferably considerably less, than one-half of the pitch of the thread of the nut in the diameter of the bolt hole. The opposite face 2 of the nut may be flat as shown in Fig. 1, or curved to correspond in outline with the face 1. In the first form the nut is gradually reduced in thickness from its margins 4—4 at opposite sides of the opening 5 to the center 6—6 of the nut. In the latter form the thickness of the nut remains uniform. After the nut is formed and threaded as above described it is subjected to pressure, preferably between two flat surfaces, sufficient to substantially eliminate the depression 1 and straighten both faces of the nut. In the form shown in Figs. 1 and 2, this pressure seems to compress the margins 4 of the nut substantially uniformly through to the face 2 producing a nut in which the pitch of its threads varies at different points about its threaded opening. At the center line 6 the threads are practically normal entirely through the nut while at the margins 4 the pitch of the threads is reduced entirely through the nut as shown in Fig. 3, thus bending the threads from a true helix and from their normal plane along a plurality of lines extending through the nut. In the form shown in Figs. 5, 6 and 7, the pressure above described merely straightens the nut and in so doing bends the threads slightly from a true helix at opposite sides of the opening 5 but in this case the pitch of the threads is not necessarily distorted. Obviously in either form the bending or deflection of the threads is preferably very slight or otherwise difficulty might be experienced in mounting the nut upon a bolt. When properly made however, as above described, a bolt of ordinary form may be readily engaged in the nut at either face and will begin to bind upon the threads to lock the same as soon as three or four threads are engaged.

From the above it is to be noted that it is not essential for the depression 1 to be formed in the working face of the nut, although in actual practice I have found it more convenient when so made owing to the usual chamfered corners and general form of the other face of the nut blanks as ordinarily made.

In general outward appearance my nut corresponds in every way with the usual or ordinary nut and it is obvious therefore that my improvement may be embodied in any class or form of nut, or nuts employed for any purpose, or formed of any material and that it is immaterial whether the outline of the depression be formed by flat planes meeting at a slight angle as shown for example in Fig. 5, or whether the surface be curved as shown in Figs. 1 and 6.

The whole invention consists in producing a nut of any preferred form having a flat working face if desired, but with threads so curved or formed that while a bolt may be freely engaged with the threads of the nut at either of its faces, it will firmly lock upon the bolt when screwed down thereon.

Having thus described my invention, what I claim as new, and desire to secure by Letters Patent is:—

1. A screw threaded nut having a continuous flat lower bearing surface and having a thread continuous from the upper surface of the nut to approximately said lower surface thereof, and all of its threads along one or more lines extending longitudinally through the opening in said nut bent from their original planes.

2. A screw threaded nut having a continuous flat lower bearing surface and having a thread continuous from the upper surface of the nut to approximately said lower surface thereof bent from its normal plane along one or more lines extending longitudinally through the threaded opening in said nut less than one-half the pitch of said thread.

3. A screw threaded nut, provided with a continuous flat lower bearing surface and having threads continuous from the upper surface of the nut to approximately said lower surface thereof each varying from a true helix along one or more lines extending through said nut.

4. A screw threaded nut, wherein the threads are continuous and normal along a plurality of lines extending longitudinally of the threaded opening in said nut, the remaining portions of the threads being of a slightly different pitch from the normal portion of the threads.

5. A screw threaded nut having an approximately continuous flat lower surface, wherein the threads are continuous from the upper surface of the nut to said lower surface thereof and the thread varies from a true helix at a plurality of lines about the threaded opening each extending longitudinally through said opening.

6. A screw threaded nut wherein the threads uniformly change in pitch at a plurality of lines regularly disposed about the threaded opening extending longitudinally through said opening.

7. A screw threaded nut wherein the threads are continuous and normal along a plurality of lines extending longitudinally of the threaded opening and the threads between said lines are slightly less than the normal pitch.

8. A nut of the character described having a threaded opening, the pitch of the successive threads along any one line being uniform all along said line but varying from the normal pitch at one or more points about said opening.

In testimony whereof, I have hereunto signed my name in the presence of two subscribing witnesses.

EDWARD R. HIBBARD.

Witnesses:
    BURTON U. HILLS,
    CHARLES I. COBB.